United States Patent [19]

Sugasawa et al.

[11] Patent Number: 5,382,876
[45] Date of Patent: Jan. 17, 1995

[54] CORD CONNECTION STRUCTURE FOR CONNECTING A BALLAST CIRCUIT AND A STARTER CIRCUIT

[75] Inventors: Masatoshi Sugasawa; Atsushi Toda; Masaru Sasaki; Masayasu Yamashita; Akihiro Matsumoto; Akiyoshi Ozaki; Goichi Oda, all of Shizuoka, Japan

[73] Assignee: Koito Manufacturing Co., Ltd., Tokyo, Japan

[21] Appl. No.: 923,503

[22] Filed: Aug. 3, 1992

[30] Foreign Application Priority Data

Aug. 5, 1991 [JP] Japan .................. 3-195549
Jul. 7, 1992 [JP] Japan .................. 4-179640

[51] Int. Cl.⁶ .............................................. B60Q 1/34
[52] U.S. Cl. ......................................... 315/82; 315/76; 315/DIG. 7; 439/29; 439/14; 361/674; 307/10.8
[58] Field of Search ............. 315/58, 82, 77, 289, 315/290, 76, DIG. 7; 439/29, 14; 361/377; 362/80; 307/10.8

[56] References Cited

U.S. PATENT DOCUMENTS

| | | | |
|---|---|---|---|
| 3,739,319 | 6/1973 | Garnett | 439/374 |
| 5,118,990 | 6/1992 | Makita | 315/82 X |
| 5,130,905 | 7/1992 | Ruter | 315/82 X |
| 5,173,062 | 12/1992 | Uchida | 439/918 X |

Primary Examiner—Robert J. Pascal
Assistant Examiner—Reginald A. Ratliff
Attorney, Agent, or Firm—Sughrue, Mion, Zinn, Macpeak & Seas

[57] ABSTRACT

A cord connection structure for connecting a ballast circuit and a starter circuit in which an output cord from a starter circuit unit mounted on a lamp body is connected to a discharge bulb inserted into a bulb insertion hole, and an output cord from a ballast circuit unit disposed in the vicinity of a starter circuit unit is removably connected through a connector to a connector connection part (receptacle) provided in the starter circuit unit, characterized in that a connector slip-off preventing protector covering the connector coupled into the connector connection part is provided around the connector connection part (receptacle). Such a construction makes it difficult for a general user to connect and disconnect the connector of high voltage to and from the connector connection part.

6 Claims, 9 Drawing Sheets

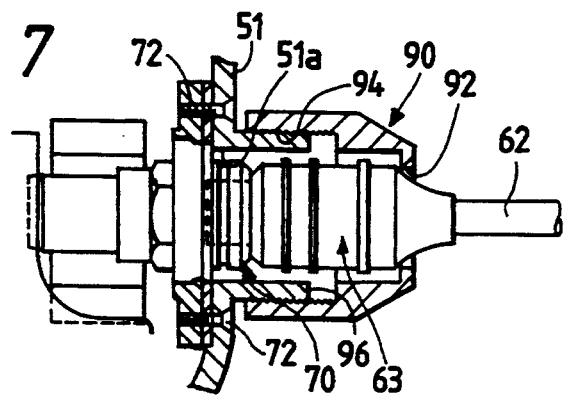
FIG. 7
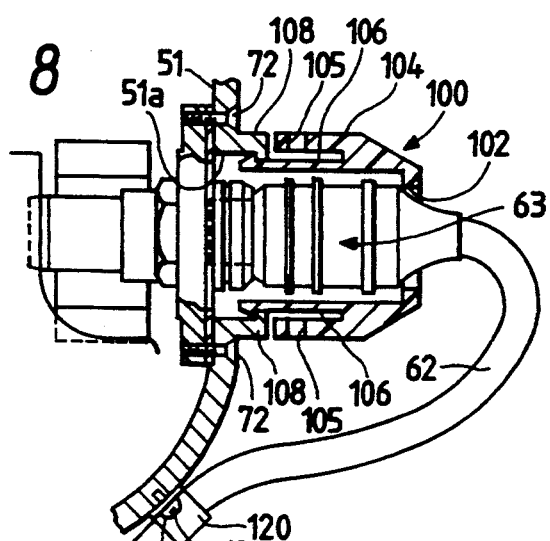
FIG. 8
FIG. 9
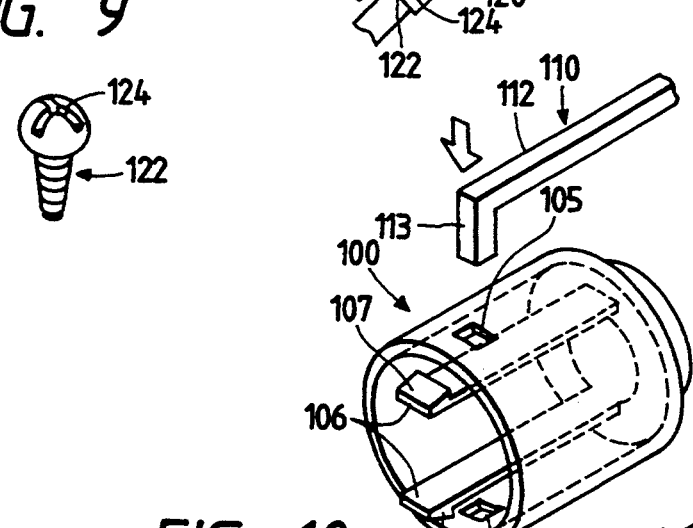
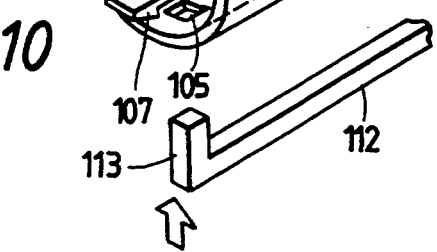
FIG. 10

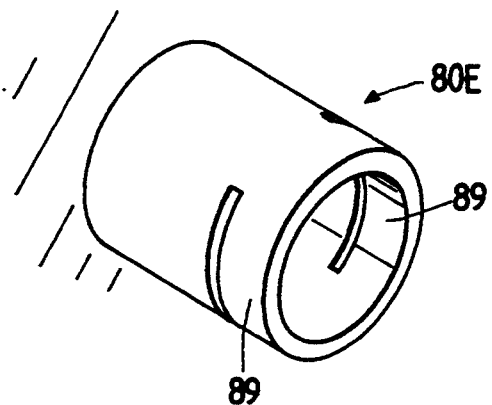
FIG. 18
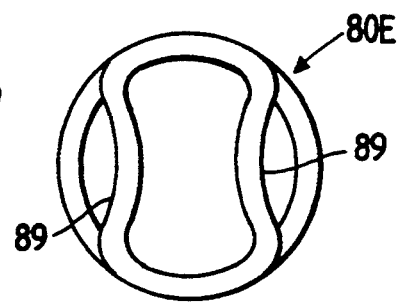
FIG. 19
FIG. 20
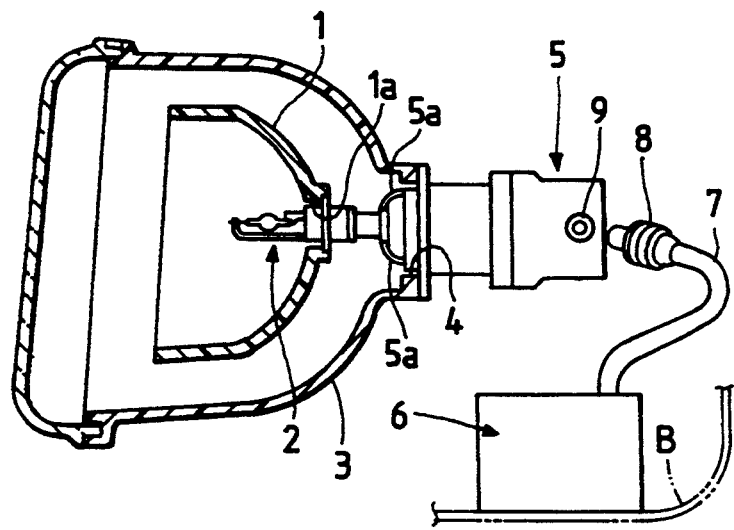

CORD CONNECTION STRUCTURE FOR CONNECTING A BALLAST CIRCUIT AND A STARTER CIRCUIT

BACKGROUND OF THE INVENTION

1. Field of the Invention

The present invention relates to a cord connection structure for connecting a starter circuit to a ballast circuit, both components being necessary for lighting a discharge bulb as a light source of the headlamps for an automobile.

2. Related Art

As bulbs for automobile headlamps, discharge bulbs recently have attracted much attention because of their high luminous intensity and high durability. When the discharge bulb is employed as a light source of the headlamp, a starter circuit and a ballast circuit must also be provided; the former is for starting the discharge bulb and the latter is for securing stable and continuous lighting of the discharge bulb. FIG. 20 is a partial cross sectional view showing a proposed cord connection structure. As shown, a discharge bulb 2 is inserted into a bulb insertion hole 1a of a reflector 1. A starter circuit unit 5 is mounted at an opening 4 of a lamp body 3. The mounting and removing operations of the discharge bulb are carried out through the opening. A ballast circuit unit 6, fixed to the car body B, is disposed near the starter circuit unit 5. The starter circuit unit 5 is connected through output cords 5a to the discharge bulb 2. The starter circuit unit 5 and the ballast circuit unit 6 respectively include a case containing therein a starter circuit and a case containing therein a ballast circuit. The circuits are connected to each other by an output cord 7. The output cord 7 extends from the ballast circuit unit 6. A connector 8 attached to one end of the output cord 7 can easily be connected to and disconnected from the connector connection part 9 of the starter circuit unit 5. In the cord connection structure for connecting the starter circuit unit to the ballast circuit unit, both the circuits 5 and 6 are connected in such a manner that the headlamp bearing the starter circuit unit 5 on the rear side thereof is mounted on a car body, the ballast circuit unit 6 is fixed to the car body, and the connector 8 is coupled to the connector connection part 9. In this respect, the cord connection structure is excellent in assembly to the car body.

However, the proposed cord connection structure as described above may suffer from a problem as follows. When the discharge bulb 2 is actuated, a high voltage is applied to the output cord 7 connecting the starter circuit unit 5 to the ballast circuit unit 6. Such a structure allows any person to touch carelessly the connector 8 for the purpose of removing the connector, which is very dangerous because of the high voltage.

SUMMARY OF THE INVENTION

The present invention has been made in view of the foregoing circumstances, and accordingly an object of the invention is to provide a cord connection structure which makes it difficult for a general person to connect and disconnect the connector for connecting a starter circuit to a ballast circuit.

To achieve the above object, a cord connection structure for connecting a ballast circuit to a starter circuit according to the present invention is constructed such that an output cord from a starter circuit unit mounted on a lamp body is connected to a discharge bulb inserted into a bulb insertion hole, and a connector of an output cord from a ballast circuit unit disposed in the vicinity of a starter circuit unit is removably connected to a connector connection part provided in the starter circuit unit. The code connection structure thus constructed is improved in that a connector slip-off preventing protector covering the connector coupled to the connector connection part is provided around the connector connection part.

According to another aspect of the present invention, the cord connection structure is improved in that the protector is formed by a cup-shaped tubular member having a flange fastened by a screw to the outside of the connector connection part, an output cord insertion hole is formed in the bottom, and a blind seal is attached to the flange by adhesion or layers of molded material are applied to the heads of the screws in the flange, thereby keeping the heads of the screws out of sight.

Further, the cord connection structure is improved in that the protector is integral with a starter circuit unit case.

Furthermore, the cord connection structure is improved in that a cup-shaped tubular member having an output cord insertion hole on the bottom thereof, and a left-handed female screw part to be in mesh with a tubular left-handed male screw part protruding from the circumferential outer surface of the connector connection part are provided.

Still further, the cord connection structure is improved in that the protector is formed by a cup-shaped tubular member having an output cord insertion hole on the bottom thereof, and wherein there are provided a plurality of resilient hook members extending therein and lance-coupled with a stopper formed along the inner surface of a tubular portion protruding from the circumferential outer surface of the connector connection part, and an outer tube located outside the protector but formed integral with the protector, the outer tube surrounding the resilient hook members and contacting the tubular portion, thereby to continuously couple the resilient hook members with the stopper, and holes through which a tool for releasing the lance-coupling stage by bending the resilient hook members inwardly is inserted, the holes being provided at locations on the outer tube opposed to the resilient hook members of the outer tube.

Still further, the cord connection structure is improved in that the connector is provided with a release for disengaging the connector from the connector connection parts, and the protector has such a size as to be capable of covering the release.

According to the cord connection structure of the present invention, the connector slip-off preventing protector covering the connector coupled into the connector connection part prevents the connector from slipping off the connector connection part.

Further, the protector as a tubular member (cup-shaped tubular member) is fastened by a screw to the starter circuit unit. The head of the screw is covered with the blind seal or the mold material layer, thereby being kept out of sight. Accordingly, a general user is discouraged from accessing the protector for the purpose of removing it. However, a person who knows that the screw head lies under the blind seal (mold material layer) can peel the seal off, loosen the screw, remove the protector, and pull the connector out of the connector connection part.

Furthermore, in the cord connection structure of the invention, since the protector is integral with the starter circuit unit case, the number of required parts is reduced.

Moreover, in the cord connection structure of the invention, the cup-shaped tubular protector is screwed around the outside of the tubular protruding portion closer to the starter circuit unit. The screw-coupling parts have left-handed screws. For general users who believe that the screws are the far-more-common right-handed screws, use of the left-handed screw makes it difficult for such users to remove the protector. Persons though who know of the presence of the left-handed screw can readily remove the protector and pull the connector from the connector connection part.

Still further, in the cord connection structure of the invention, the cup-shaped tubular protector is locked in a manner such that the resilient hook members covered with the outer tube are lance-coupled with the stopper extending along the inner surface of the tubular portion protruding from the circumferential outer surface of the connector connection part. To remove the protector, a tool for removing the lance-coupling state which can bend the resilient hook members inwardly must be used. Accordingly, a person cannot remove the protector unless the special tool is used. On the other hand, if the special tool is used, the user can readily remove the lance-coupling by bending the resilient hook members inwardly, and pull out the connector.

Moreover, provision of the protector prevents access thereto by an untrained user for the purpose of pulling out the connector.

BRIEF DESCRIPTION OF THE DRAWINGS

FIG. 7 is a partial, cross sectional view showing a portion including the connector which is a key portion of a second embodiment of the present invention;

FIG. 8 is a cross sectional view showing a key portion including the connector according to a third embodiment of the present invention;

FIG. 9 is a perspective view showing a special screw for fixedly supporting an output cord;

FIG. 10 is a perspective view showing a vibration eliminating protector as a key portion of the embodiment;

FIG. 18 is a cross sectional view showing the structure of and near a connector as a key portion of a ninth embodiment of the present invention;

FIG. 19 is a front view showing the protector of the ninth embodiment; and

FIG. 20 is a partial, cross sectional view showing a conventional cord connection structure for connecting a ballast circuit and a starter circuit.

DESCRIPTION OF THE PREFERRED EMBODIMENTS

The preferred embodiments of the present invention will now be described with reference to the accompanying drawings.

Figure 1:
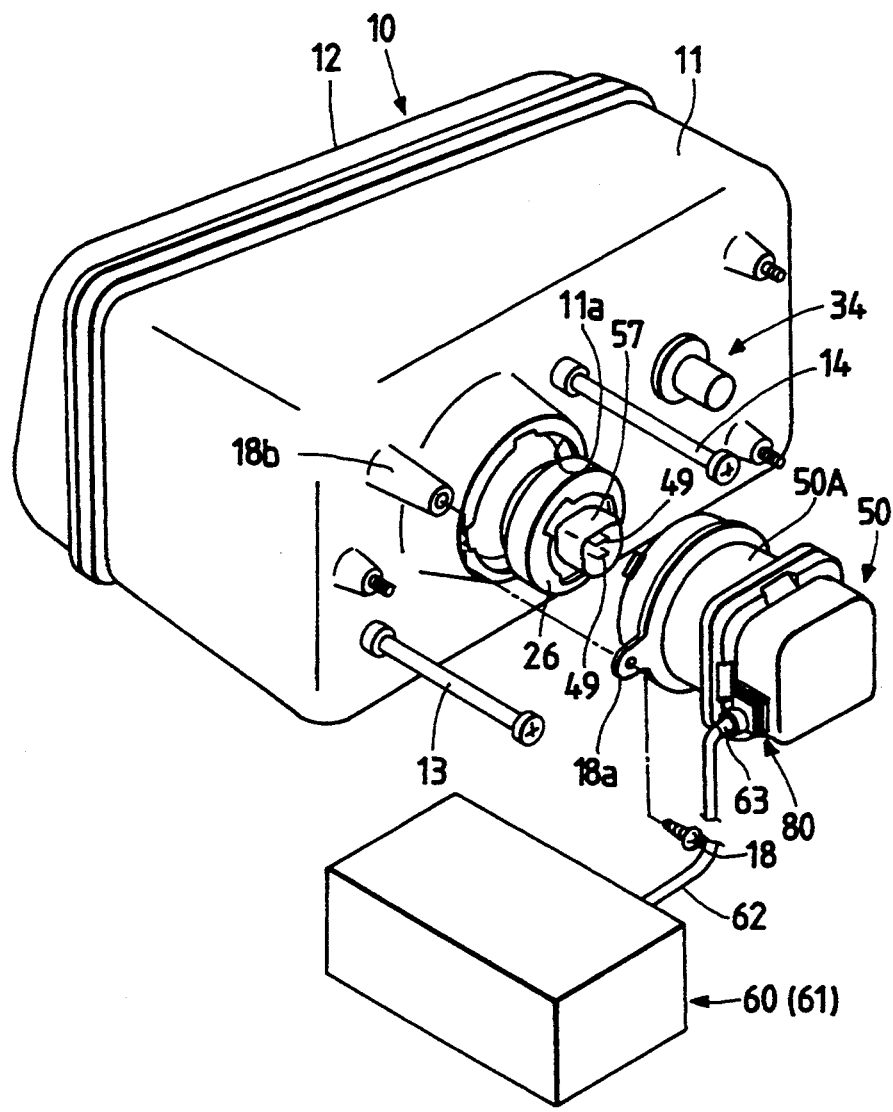
FIG. 1 is a perspective view showing a cord connection structure for connecting a ballast circuit and a starter circuit which is a first embodiment of the present invention.
Figure 2:
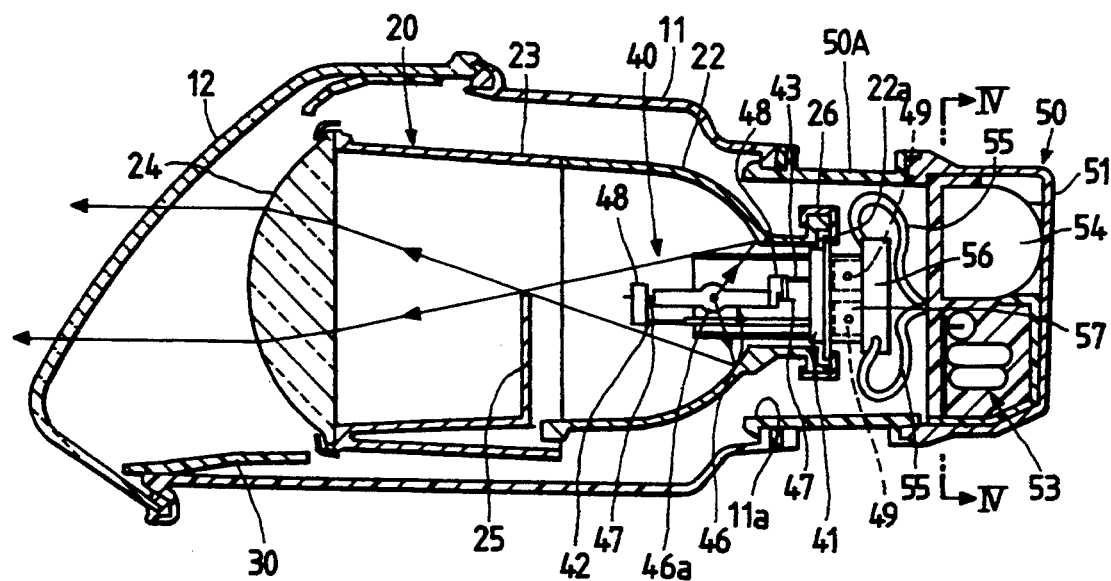
FIG. 2 is a longitudinal sectional view showing a headlamp having a starter circuit unit assembled thereinto, which constitutes a key portion of the first embodiment.
Figure 3:
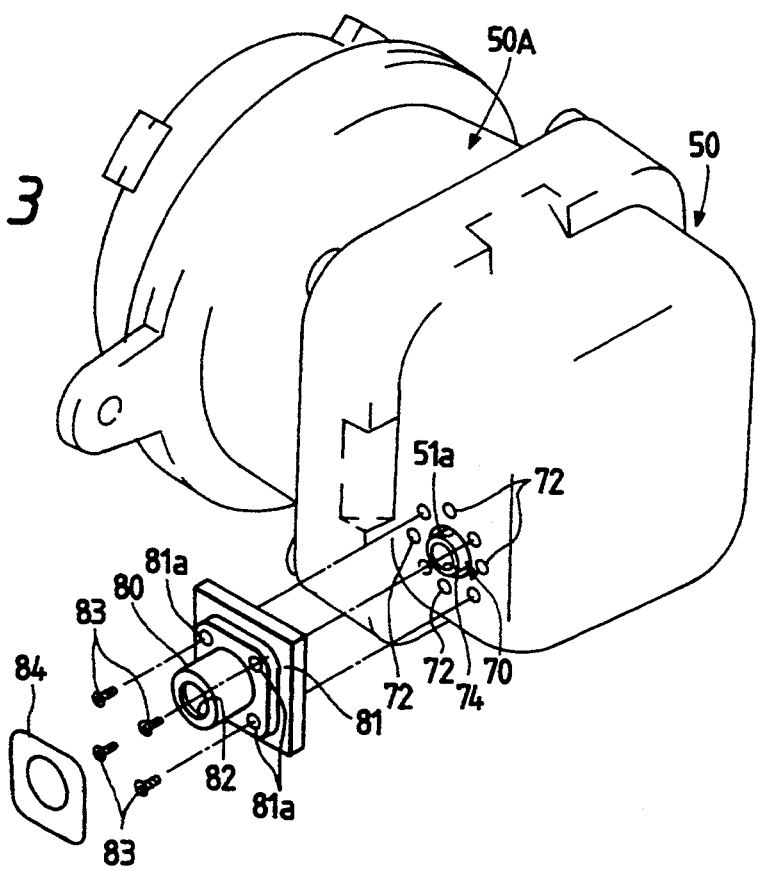
FIG. 3 is a perspective view, partially exploded, showing a protector for eliminating connector vibrations, which also constitutes a key portion of the present invention.
Figure 4:
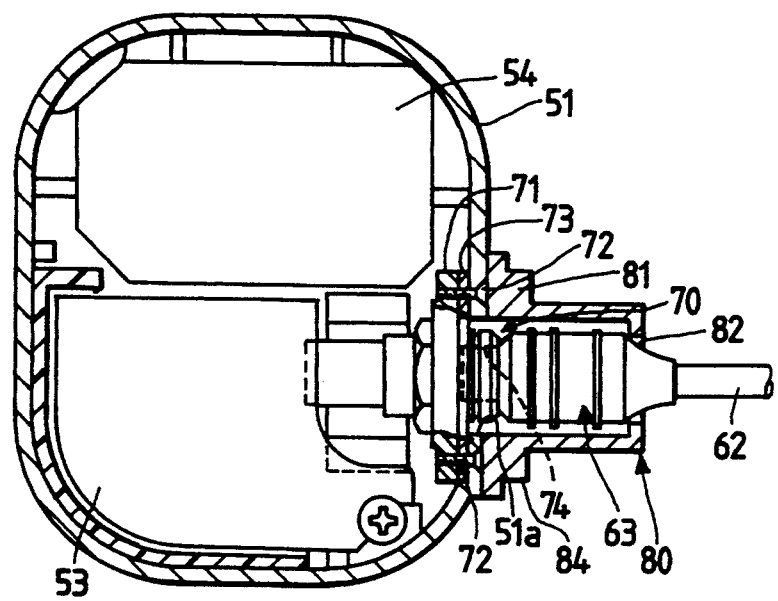
FIG. 4 is an enlarged, cross sectional view showing a portion including the protector, which is a key portion of the present invention.
Figure 5:
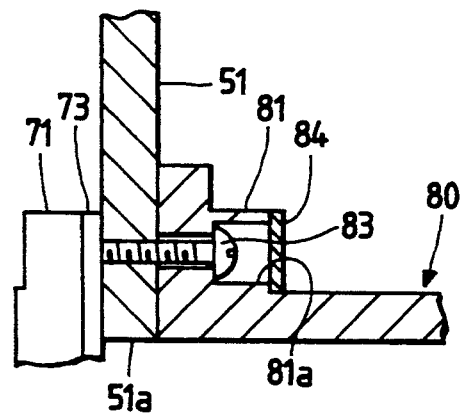
FIG. 5 is an enlarged, cross sectional view showing a fixing portion of a protector to a starter circuit unit case.

In FIGS. 1 through 5 showing the construction of a first embodiment of the present invention, FIG. 1 is a perspective view showing a cord connection structure for connecting a ballast circuit and a starter circuit, which is the first embodiment of the present invention, FIG. 2 is a longitudinal sectional view showing a headlamp having a starter circuit unit assembled thereinto, which constitutes a key portion of the first embodiment, FIG. 3 is a perspective view, partially exploded, showing a protector for eliminating connector vibrations, which also constitutes a key portion of the present invention, FIG. 4 is an enlarged, cross sectional view showing a fixing portion of the protector where the protector is fixed to the starter circuit unit, and FIG. 5 is an enlarged, cross sectional view showing a fixing portion of a protector for fixing the protector to a starter circuit unit case.

In the figures, reference numeral 10 designates a headlamp for an automobile. A front lens 12 is mounted on the front opening of a box-like lamp body 11 of the headlamp 10, so that a space is formed therein. Within the space, a light projection unit 20, partially constituting a headlamp main body, tiltably supported by an aiming mechanism (including two aiming screws 13 and 14, and one ball socket).

A substantially ellipsoidal reflector 22 and a lens holder 23 for supporting a projection lens 24 are assembled into a single piece which forms the projection unit 20. A discharge bulb 40 is inserted into a bulb holding hole 22a of the reflector 22. Light beams emitted form a discharge part 46a of an arc tube 46 of the discharge bulb 40 are reflected by the reflector 22, and are projected by the projection lens 24. Reference numeral 25 designates a shade for defining a clear cut line, and reference numeral 26 represents a locking cap for locking the discharge bulb 40 to the hole 22a. Numeral 30 indicates a cover made of synthetic resin. The cover 30, the surface of which is vapor deposited with aluminum, is disposed around the projection unit 20. A reflector (not shown) for use with the clearance lamp, on the side of the cover 30, is formed integrally with the cover. A bulb 34 (see FIG. 1) for use with the clearance lamp is inserted into the reflector and fixed thereto.

As for the discharge bulb 40, the arc tube 46 is supported by long and short lead supports 42 and 43, which protrude forwardly from an insulating base 41. A pair of electrodes, opposed to each other, are provided within the discharge part 46a of the arc tube 46. Lead wires 47 and 47 from the electrodes are welded to metal supports 48 and 48 supported by the lead supports 42 and 43. A male connector 57 is formed on the rear side of the discharge bulb 40. A pair of terminals 49, which are connected to respective ones of the lead supports 42 and 43, protrude from the male connector 57.

An opening 11a through which the bulb is mounted is formed in the rear side of the lamp body 11. A starter circuit unit 50 is mounted in the opening 11a with a tubular extended part 50A. Reference numeral 18 designates a screw for fastening a bracket 18a of the extended part 50A to a boss 18b. The starter circuit is required to light the discharge bulb 40 by applying a high voltage thereto. Starter circuit components, such as a printed circuit board 53 having electronic elements mounted thereon and a transformer 54 are contained in a case 51. The case 51 is synthetically molded into a single piece as the starter circuit unit 50. An output cord 55 leads from the starter circuit unit 50. A female connector 56 provided at the end of the output cord is inserted into the male connector 57, which is formed at the rear end of the discharge bulb 40, so that the starter circuit unit 50 is electrically connected to the discharge bulb 40. A receptacle 70 as a connector connection part is provided in the case side wall of the starter circuit unit 50. A connector 63, which is coupled with the end of the output cord 62 from a ballast circuit unit 60, is inserted into the receptacle 70, whereby the ballast circuit unit 60 is electrically connected to the starter circuit unit 50. The ballast circuit unit 60 is constructed such that a ballast circuit (not shown) is placed into a case 61. The ballast circuit is required for providing stable and continuous discharge of the headlamp 10.

The receptacle 70 has a flange 71. As shown in FIGS. 4 and 5, the flange 71 is fastened to the peripheral edge of a receptacle receiving opening 51a of the case 51. The receptacle 70 as the connector connecting part is exposed through the opening 51a. Reference numeral 73 designates a packing. The receptacle 70 has a recess 74 which can receive the connector 63. A terminal as the counterpart of the connector terminal is formed in the recess 74. The printed circuit board 53 can readily be inserted into and removed from the recess. A protector 80, which is provided for preventing the connector from slipping off and which surrounds receptacle 70, is fixed by screws 83 to the peripheral edge of the opening 51a. The protector 80 is a cup-shaped tubular member with a flange, which has a hole 82 through which the cord is inserted. A screw receiving part 81a of a flange 81 is formed as a spot facing part. Accordingly, the head of the screw is not protruded from the flange 81. A blind seal 84 is attached to the flange 81 by adhesion. Accordingly, the head of each screw 83 is kept out of sight. The hole 82 is smaller in outer diameter than the connector 63. With this arrangement, the connector 63 is firmly held by the hole.

With such a structure, a general user cannot see the screws 83 and hence cannot know the connection structure of the connector 63. Therefore, there is no change that the user will attempt to pull the connector 63 out of the structure. On the other hand, a person who knows the structure of the protector 80 can peel the blind seal 84 from the flange to expose the heads of the screws 83, loosen the screws 83, and pull out the connector 63.

Figure 6:
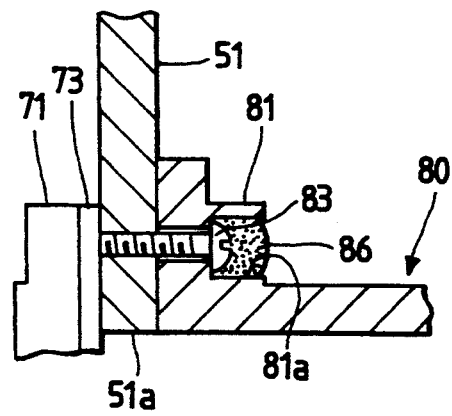
FIG. 6 is an enlarged, cross sectional view showing a key portion of the second embodiment.

FIG. 6 is a cross sectional view sowing a second embodiment of the present invention. In the first embodiment, the blind seal 84 is used for keeping the screws 83 out of sight. In the present embodiment, on the other hand, a recess 81a for receiving each screw is filled with resin mold material 86, thereby concealing the screw heads. The remaining portion of the second embodiment is the same as the corresponding portion of the first embodiment.

FIG. 7 is a partial cross sectional view showing a portion including the connector which is a key portion of a third embodiment of the present invention. Reference numeral 90 designates a protector for preventing the connector from slipping off. The protector 90 is a cup-shaped tubular member with a cord insertion hole 92. A left-handed male screw thread 94 is formed in the inner surface of the hole 92. The protector 90 fits around a tubular portion 95 extending to the circumferential edge of the opening 51a. The coupling portion of the protector 90 and the tubular portion 95 has left-handed threads. To separate the protector 90 from the tabular portion 95, the protector 90 is turned clockwise. A general user will believe that the right-handed screw coupling is used for the coupling portion of the protector and the tubular portion. Accordingly, the left-handed screw coupling structure makes it difficult for the user to remove the protector 90. However, a person who knows of the left-handed screw coupling structure can readily remove the protector 90 and pull out the connector 63.

FIGS. 8 through 10 show the construction of a fourth embodiment of the present invention. FIG. 8 ius a partial cross sectional view showing a key portion including the connector essential to the present invention. FIG. 9 is a perspective view showing an output cord fixing screw. FIG. 10 is a perspective view showing a protector.

A protector 100 is a cup-shaped tubular member having a cord insertion opening 102. A pair of resilient hook members 106 are integrally formed on the inner side of an outer tube 104. The hook members 106 are forwardly protruded beyond the outer tube 104 so that the hooks 107 of the hook members 106 hook on a ring-like stopper 108, which is formed at the circumferential edge of the opening 51a into which the receptacle 70 is inserted. The outer tube 104 contacts the front face of the ring-like stopper 108 to hold the lance-coupling state of the hooks 107. Holes 105 are provided at locations opposed to the hook members 106 on the outer tube 104. To remove the protector 100, the forward parts 113 of arms 112 of a tool 110 are inserted into the holes 105 in the directions of arrows in FIG. 9, thereby to bend the hook members 106 inwardly. Then, the hooks 107 are made to disengage from the ring-like stopper 108. For removing the protector 100, such a special tool 110 must be used. Use of the tool hinders easy removal of the connector 63 by the user.

The output cord 62 is fixedly supported by fixing means 120 fastened by a screw to a unit case 51, in the vicinity of the protector 100. A screw 122 for fixing the fixing means 120, as shown in FIG. 8, has a T-shaped groove at the top where it engages the fixing means. Accordingly, to unscrew the screw 122, a driver specially designed for the special screw 122 must be used. Use of the special driver also makes it difficult for a general user to remove the protector 100 or to pull out the connector 63.

Figure 11:
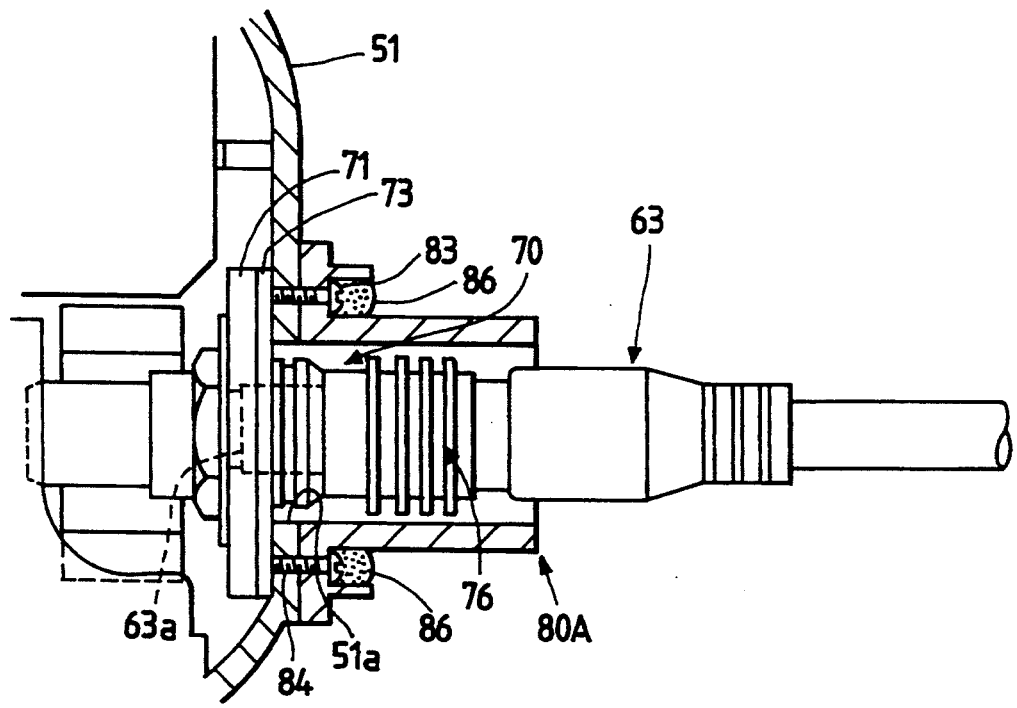
FIG. 11 is a cross sectional view showing the structure of and near the connector as a key portion according to the fifth embodiment of the present invention.
Figure 12:
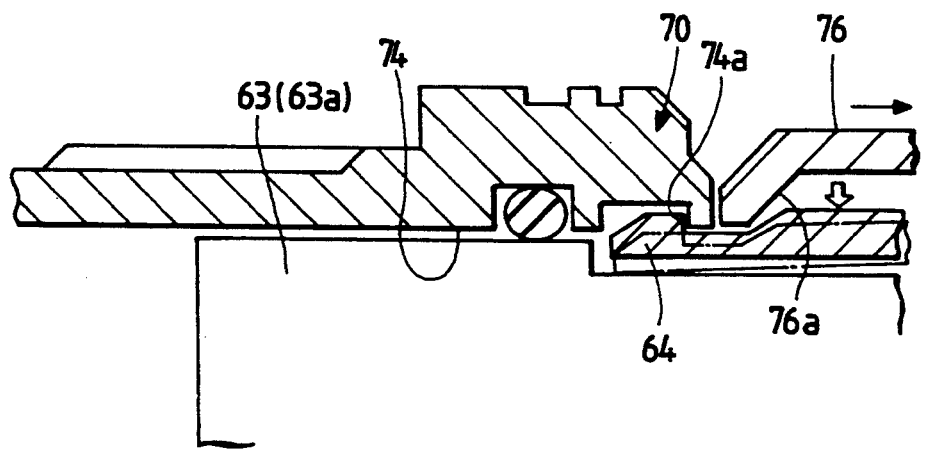
FIG. 12 is an enlarged cross sectional view showing the coupling structure for coupling the connector connection part with the connector.
Figure 13A:
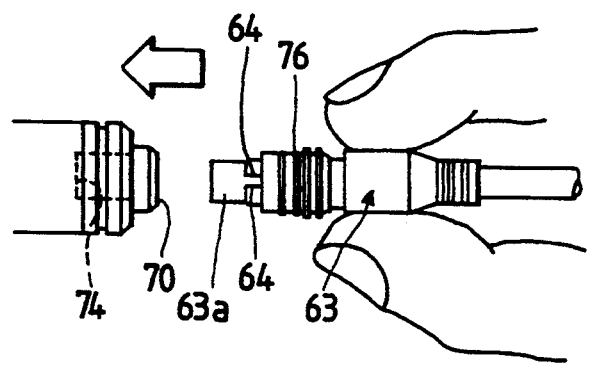
FIG. 13A is a side view showing the insertion of the connector to the receptacle when no protector is used.
Figure 13B:
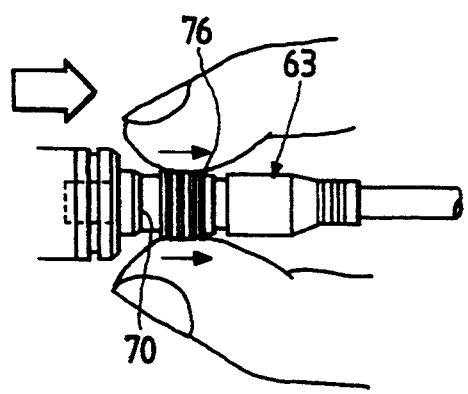
FIG. 13B is a side view showing the removal of the connector from the receptacle when no protector is used.

FIGS. 11 to 13 together show a fifth embodiment of the present invention. Of these figures, FIG. 11 is a cross sectional view showing a portion of the cord connection structure which includes mainly the connector as a key portion of the present invention. FIG. 12 is an enlarged cross sectional view showing the coupling structure for coupling the connector connection part with the connector. FIGS. 13A and 13B are explanatory diagrams showing how the connector is connected to and disconnected from the receptacle when no protector is used. Specifically, FIG. 13A is a side view showing the insertion of the connector to the receptacle when no protector is used, and FIG. 13B is a side view showing the removal of the connector from the receptacle when no protector is used.

In those figures, reference numeral 76 designates a release that is set around the connector 63 in such a manner that it is slidable in the axial direction. The release 76 is used for connecting and disconnecting the connector to and from the receptacle. As shown in FIG. 12, a protruding part 63a, which engages a receding part 74 of the receptacle 70, is formed at the forward end of the connector 63. The circumferential forward end of the protruding part 63a has a plurality of hooks 64 circumferentially arrayed and axially extended to hook at the recess 74a of the receptacle. The release 76, which is tubular shaped, and is mounted in a state that it surrounds the hooks 64, functions to disengage the hooks 64 from the recess 74a. To couple the connector 63 with the receptacle 70, the protruding part 63a of the connector 63 is inserted into the receding part 74 of the receptacle, as shown in FIG. 13A. In this case, the hooks 64 resiliently engage the recess 74a of the receptacle. Thus, the connector can be coupled into the receptacle in a one-touch manner. The coupling work of the connector 63 is done in the same way irrespective of use of the protector. To pull the connector 63 out of the release 76, the release 76 is forcibly slid in the rearward direction, as shown in FIG. 13B. A pawl 76a of the forward end of the release 76 pushes down (as viewed in the radial direction) each hook 64 in the direction of an arrow (FIG. 12), so that the hooks 64 are placed at the positions indicated by a phantom line (FIG. 12). As a result, the hooks 64 disengage from the recess 74a, allowing the connector 63 to be separated from the receptacle 70.

A protector 80A, which is a cup-shaped tubular member with a flange and which surrounds the release 76, is fastened by a screw to the receptacle receiving opening 51 of the case 51. The open end of the protector 80A extends beyond the release 76. With the provision of the protector, after the connector 63 is inserted into the receptacle 70, the release 76 disposed within the protector 80A rejects access thereto from the exterior. In other words, a general user cannot pull out the connector 63. Further, the general user cannot remove the protector 80A since the screws 83 for fixing the protector are covered with the resin mold material 86. However, a person who knows the screw fixing structure can easily remove the connector 63 in such a manner that the resin mold material 86 is removed to expose the screw heads to the exterior. The screws can then be loosened, the protector 80A removed, and the release 76.

Figure 14:
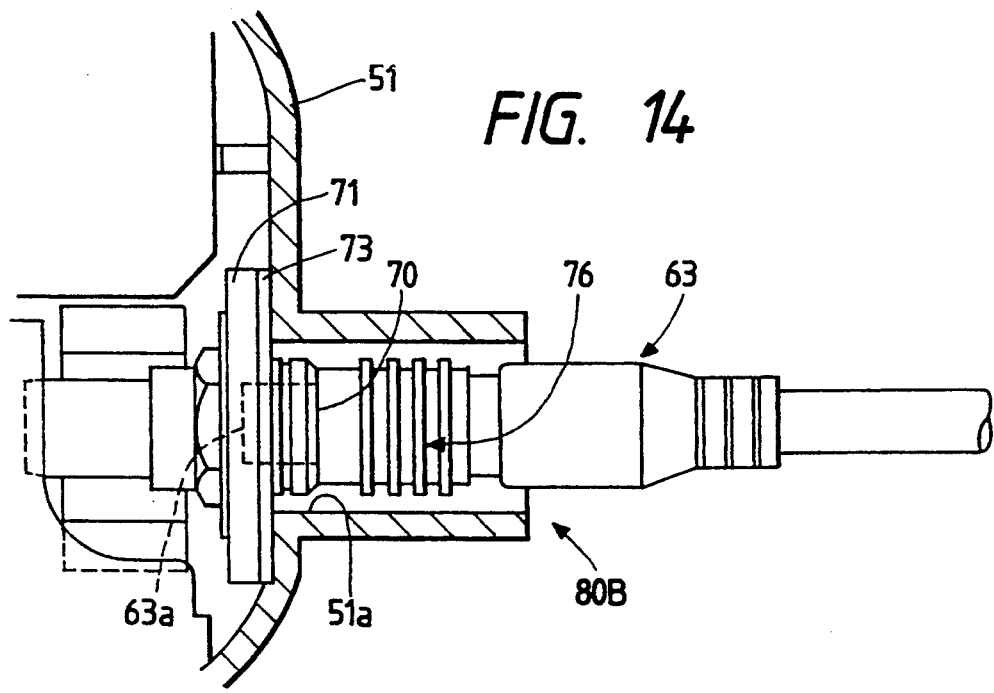
FIG. 14 is a partial, cross sectional view showing the structure of and near a connector as a key portion of a sixth embodiment of the present invention.

FIG. 14 is a cross sectional view showing a key portion of a sixth embodiment of the present invention. In this embodiment, a protector 80B is integral with the starter circuit unit case 51. The remaining construction of the embodiment is the same as the corresponding one of the fifth embodiment (see FIGS. 11 through 13). In this cord connection structure, once the connector 63 is inserted into the receptacle 70, it is impossible to remove the connector from the receptacle.

Figure 15:
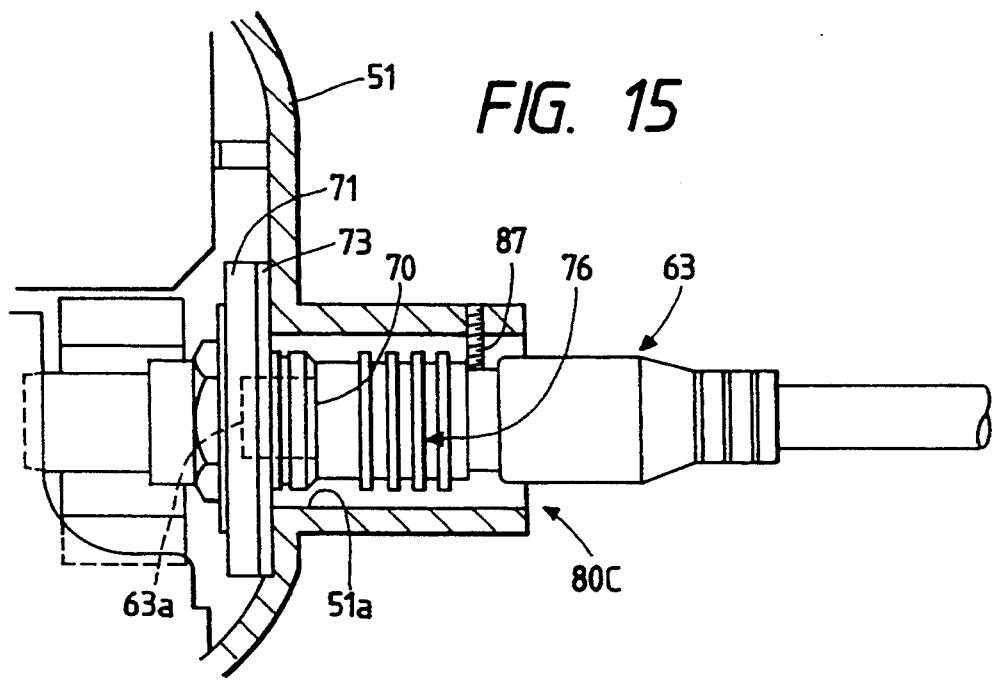
FIG. 15 is a partial, cross sectional view showing the structure of and near a connector as a key portion of a seventh embodiment of the present invention.

FIG. 15 is a cross sectional view showing a key portion of a seventh embodiment of the present invention. In this embodiment, a screw 87 is provided in the side wall of the tubular portion constituting a protector 80C. The screw serves as a stopper for preventing the release 76 from moving rearwardly. Accordingly, it prevents the connector plug 63 from slipping out of the receptacle. After the screw 87 is screwed into the side wall, the head of the screw 87 is cut off. It is impossible to remove the screw. Therefore, the structure of this embodiment makes it further difficult for a user to pull out the connector 63.

Figure 16:
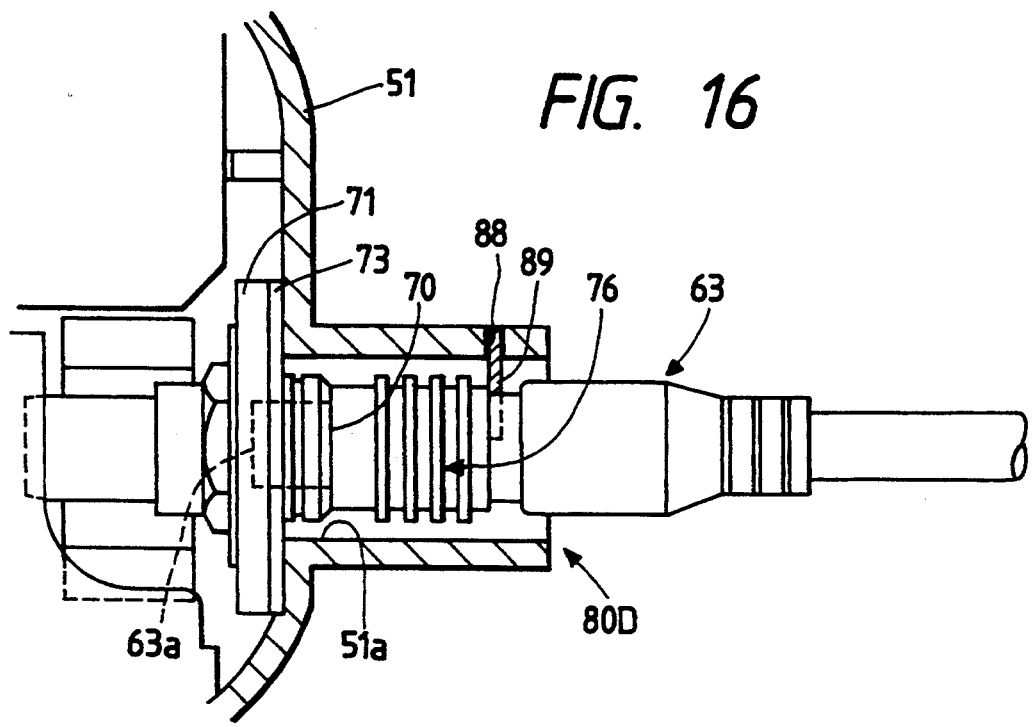
FIG. 16 is a partial, cross sectional view showing the structure of and near a connector as a key portion of an eighth embodiment of the present invention.
Figure 17:
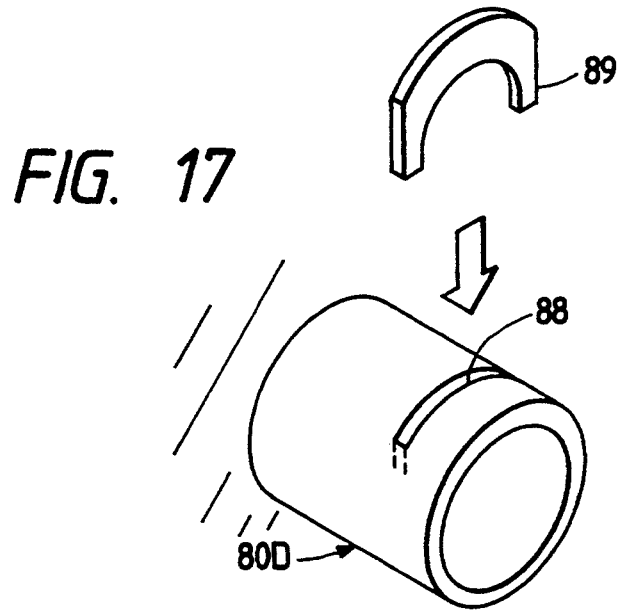
FIG. 17 is a perspective view showing a stopper for preventing the sliding of a release in the eighth embodiment.

In FIGS. 16 and 17, which together depict an eighth embodiment of the present invention, FIG. 16 is a cross sectional view showing the structure of and near a connector essential to the present invention, and FIG. 17 is a perspective view showing a stopper for blocking the rearward movement of the release.

A slit 88, which is formed in the upper part of the tubular part constituting a protector 80D, radially passes through the upper part. A stopper plate 89, when inserted into the slit 88, engages the release 76 and stops the rearward movement of the release 76. Otherwise, the release 76 may rearwardly move to remove the locking state of the release.

In FIGS. 18 and 19, which together show a ninth embodiment of the present invention, FIG. 18 is a perspective view showing a protector, and FIG. 19 is a front view showing the protector.

A tubular portion constituting a protector 80E has a pair of slits, opposed to each other, in the wall thereof closer to its opening. With the formation of slits, band-like 89, which are apt to be radially deformed, are formed closer to the opening. The band-like areas 89, deformed inwardly as shown in FIG. 19, serve as stoppers to prevent the connector 63 from slipping off.

As seen from the foregoing description, in the cord connection structure for connecting the ballast circuit and the starter circuit of the invention, the cord slip-off preventing protector covers the connector coupled to the connector connection part, thereby preventing access by a user to pull out the cord. Therefore, the user is prevented from pulling out the high voltage cord, thus ensuring safety.

Further, in the cord connection structure of the invention, the protector as a tubular member (cup-shaped tubular member) is fastened by a screw to the starter circuit unit. The head of the screw is covered with a blind seal or a molded material layer, thereby being kept out of sight. Accordingly, a general user is prevented from accessing the protector for the purpose of removing it. There is less chance that the user will remove the protector. However, a person who knows that the screw head lies under the blind seal (mold material layer) can peel the seal off, loosen the screw, remove the protector, and pull the connector out of the connector connection part. The cord connection structure is advantageous in assembling and maintenance. For example, the ballast circuit alone can be separated.

Furthermore, in the cord connection structure of the invention, since the protector is integral with the starter circuit unit case, the number of required parts is reduced. This brings about a simplified construction, easy in assembling, and reduction of cost to manufacture.

Still further, in the cord connection structure of the invention, the cup-shaped tubular protector is screwed around the outside of the tubular protruded portion closer to the starter circuit unit. The screw-coupling parts have left-handed screws. For general users who believe that the screws are right-handed screws, use of the left-handed screw makes it for the users to remove the protector. Therefore, it is a rare case that the user will remove the protector. Persons who know of the left-handed screw can readily remove the protector and pull the connector form the connector connection part. The cord connection structure is also advantageous in assembling and maintenance. For example, the ballast circuit alone can be separated.

Moreover, in the cord connection structure of the invention, the cup-shaped tubular protector is locked in such a manner that the resilient hook members covered with the outer tube are lance-coupled with the stopper extending along the inner surface of the tubular portion protruding from the circumferential outer surface of the connector connection part. To remove the protector, a special tool for removing the lance-coupling state which can bend the resilient hook members inwardly must be used. Accordingly, a person cannot remove the protector unless the special tool is used. The user will not remove the protector. On the other hand, if the tool is used, the user can readily remove the lance-coupling by bending the resilient hook members inwardly, and pull out the connector. Also, the cord connection structure is advantageous in assembling and maintenance. For example, the ballast circuit alone can be separated.

Still further, in the cord connection structure of the invention, provision of the protector covering the release prevents access thereto of a user for the purpose of pulling out the connector. Therefore, the user is prevented from pulling out the high voltage cord, thus ensuring safety.

What is claimed is:

1. A cord connection structure for connecting a ballast circuit to a starter circuit in which an output cord deriving from a starter circuit unit mounted on a lamp body is connected to a discharge bulb inserted into a bulb insertion hole, and a connector of an output cord derived from a ballast circuit unit disposed in the vicinity of a starter circuit unit is removably connected to a connector connection part provided in the starter circuit unit, comprising means provided around said connector connection part for preventing said output cord from slipping-off, said cord slipping-off preventing means covering said connector coupled into said connector connection part.

2. The cord connection structure according to claim 1, wherein said cord slipping-off preventing means comprises a cup-shaped tubular member having a flange fastened by screw to the outside of said connector connection part, an output cord insertion hole formed in a bottom thereof, and a blind seal attached onto said flange by one of adhesion and mold material layers, said blind seal being applied to heads of said screws disposed in said flange, whereby keeping the heads of the screws from sight.

3. The cord connection structure according to claim 1, wherein said cord slipping-off preventing means is unitary formed with said starter circuit unit.

4. The cord connection structure according to claim 1, wherein said cord slipping-off preventing means comprises a cup-shaped tubular member having an output cord insertion hole in a bottom thereof, and a left-handed female screw part to be in mesh with a tubular left-handed male screw part protruded from the circumferential outer surface of the connector connection part.

5. The cord connection structure according to claim 1, wherein said cord slipping-off preventing means comprises a cup-shaped tubular member comprising:
    an output cord insertion hole in a bottom;
    a plurality of resilient hook members extended therein and lance-coupled with a stopper formed along an inner surface of a tubular portion protruded from a circumferential outer surface of said connector connection part;
    an outer tube located outside said cord slipping-off preventing means and unitary formed with cord slipping-off preventing means, said outer tube surrounding said resilient hook members and coming in contact with said tubular portion, thereby to continuously couple said resilient hook members with said stopper; and
    holes through which a tool for removing the lance-coupling state by bending said resilient hook members inwardly is inserted, being provided at locations of said outer tube opposed to said resilient hook members of said outer tube.

6. The cord connection structure according to claim 1, wherein said cord slipping-off preventing means comprises a release member for disengaging said connector from said connector connection part, and said cord slipping-off preventing means has such a size as to be capable of covering the release member.

* * * * *